US010937288B2

(12) United States Patent
Li (10) Patent No.: US 10,937,288 B2
(45) Date of Patent: Mar. 2, 2021

(54) THEFT PREVENTION MONITORING DEVICE AND SYSTEM AND METHOD (71) Applicants: Zhejiang Geely Holding Group Co., Ltd., Hangzhou (CN); Zhejiang Geely Automobile Research Institute Co., Ltd., Taizhou (CN)

(72) Inventor: Shufu Li, Hangzhou (CN)

(73) Assignees: ZHEJIANG GEELY HOLDING GROUP CO., LTD., Zhejiang Province (CN); ZHEJIANG GEELY AUTOMOBILE RESEARCH INSTITUTE CO., LTD., Zhejiang Province (CN)

( * ) Notice: Subject to any disclaimer, the term of this patent is extended or adjusted under 35 U.S.C. 154(b) by 256 days.

(21) Appl. No.: 16/088,064

(22) PCT Filed: Jan. 4, 2017

(86) PCT No.: PCT/CN2017/070180
§ 371 (c)(1),
(2) Date: Sep. 24, 2018

(87) PCT Pub. No.: WO2017/166893
PCT Pub. Date: Oct. 5, 2017

(65) Prior Publication Data
US 2020/0302763 A1 Sep. 24, 2020

(30) Foreign Application Priority Data
Mar. 28, 2016 (CN) .......................... 2016 1 0183444

(51) Int. Cl.
G08B 13/196 (2006.01)
G06K 9/00 (2006.01)
G08B 13/16 (2006.01)

(52) U.S. Cl.
CPC ... *G08B 13/19613* (2013.01); *G06K 9/00771* (2013.01); *G08B 13/1645* (2013.01); *G08B 13/19621* (2013.01); *G08B 13/19647* (2013.01); *G08B 13/19684* (2013.01); *G08B 13/19697* (2013.01)

(58) Field of Classification Search
None
See application file for complete search history.

(56) References Cited

U.S. PATENT DOCUMENTS

2004/0113777 A1 6/2004 Matsuhira et al.
2011/0285851 A1* 11/2011 Plocher .................... H04N 7/18
348/152

(Continued)

FOREIGN PATENT DOCUMENTS

CN 1593859 A 3/2005
CN 101786272 A 7/2010

(Continued)

*Primary Examiner* — Eileen M Adams
(74) *Attorney, Agent, or Firm* — Cheng-Ju Chiang (57) ABSTRACT

The theft prevention monitoring device, system and method are provided. The theft prevention monitoring device includes: a housing, a moving mechanism, a controller, and a video control module, the controller includes a moving control module, an image recognition module, and a sound and light control module; the moving control module is adapted to control a moving mechanism to move along a running route; the video control module is adapted to use a camera to scan environment information, real-time build dynamic map of environment, and generate the running route; the image recognition module is adapted to match captured videos or images of people with pre-stored videos or images of people to obtain matching result, provide corresponding control instructions; a sound and light alarm of the sound and light control module is adapted to give an alarm by sending out sound and light according to the corresponding control instructions.

19 Claims, 5 Drawing Sheets

(56) References Cited

U.S. PATENT DOCUMENTS

| | | | | |
|---|---|---|---|---|
| 2012/0177353 A1* | 7/2012 | Dowell | ............... | G02B 27/40 |
| | | | | 396/106 |
| 2015/0279183 A1* | 10/2015 | Kobayashi | ............ | G05B 15/02 |
| | | | | 455/404.1 |
| 2015/0367957 A1* | 12/2015 | Uskert | ................... | B64D 47/08 |
| | | | | 348/38 |
| 2016/0022107 A1 | 1/2016 | Kim et al. | | |
| 2019/0043002 A1* | 2/2019 | King | ................ | G06Q 30/0281 |

FOREIGN PATENT DOCUMENTS

| | | | |
|---|---|---|---|
| CN | 102253673 | A | 11/2011 |
| CN | 102302858 | A | 1/2012 |
| CN | 102411368 | A | 4/2012 |
| CN | 102932570 | A | 2/2013 |
| CN | 202753149 | U | 2/2013 |
| CN | 202957482 | U | 5/2013 |
| CN | 204650695 | U | 9/2015 |
| CN | 105058393 | A | 11/2015 |
| CN | 105225392 | A | 1/2016 |
| CN | 105345805 | A | 2/2016 |
| CN | 105352508 | A | 2/2016 |
| CN | 105654648 | A | 6/2016 |
| JP | 2000-278671 | A | 10/2000 |
| JP | 2001-25984 | A | 1/2001 |
| JP | 2004-38761 | A | 2/2004 |
| JP | 2004-185080 | A | 7/2004 |
| JP | 2012-78950 | A | 4/2012 |
| JP | 2014-2500 | A | 1/2014 |

\* cited by examiner

THEFT PREVENTION MONITORING DEVICE AND SYSTEM AND METHOD

CROSS REFERENCE TO RELATED APPLICATIONS

The present application is a 35 U.S.C. § 371 National Phase conversion of International (PCT) Patent Application No. PCT/CN2017/070180, filed on Jan. 4, 2017, which is based on and claims priority of Chinese Patent Application No. 201610183444.2, filed on Mar. 28, 2016. The entire disclosure of the above-identified application, including the specification, drawings and claims are incorporated herein by reference in its entirety. The PCT International Patent Application was filed and published in English.

FIELD OF THE INVENTION

The present disclosure relates to monitoring technology, and more particularly to a theft prevention monitoring device, a theft prevention monitoring system, and a theft prevention monitoring method.

BACKGROUND OF THE INVENTION

With advances in technology, smart products, such as, electronic devices are more and more convenient and have an increasing capacity of their user-data storage mediums (such as a hard disc of a personal computer or a flash memory). These electronic devices are often used in home or office. In addition, the increasing availability of wired and wireless networks often allows the user to connect to a network, such as the Internet or an organizations internal network, to access resources and data files. Thus, electronic devices are frequently used and deeply relied on today. However, a challenge of these electronic devices in home or office, is that they are often a target for thieves due to their small size and relative high value when compared with their size. Thus, the security of home or office is more and more important.

While technologies are available to help secure home or office, such as security cables of monitoring equipment that installed in walls or other relatively fixed location, this monitoring equipment is expensive and have poor using effect. For example, when the user goes out, and he cannot immediately know the scene of the situation and cannot timely make appropriate treatment.

With the development of science and technology, intelligent robots are used in home or office. But this kind of robot usually only has one function of electronic pet, and cannot have another function of watchdog. Therefore, a device, a system and a method are needed to have two kinds of functions of pet and watchdog in order to effectively monitor environment and take appropriate actions.

SUMMARY OF THE INVENTION

The present invention provides a theft prevention monitoring device, a theft prevention monitoring system and a theft prevention monitoring method, for monitoring a surrounding environment effectively.

According to one embodiment of the present invention, a theft prevention monitoring device includes: a housing, a moving mechanism which is arranged under the housing, a controller inside the housing, and a video control module which includes a camera on the housing, the controller comprising a moving control module, an image recognition module, and a sound and light control module, the sound and light control module comprising a sound and light control alarm; the moving control module, adapted to control a moving mechanism of the theft prevention monitoring device to move along a running route; the video control module, adapted to use the camera to scan environment information, real-time build dynamic map of environment according to the environmental information, and generate the running route for navigating the theft prevention monitoring device during the moving mechanism moves, wherein the camera is also adapted to detect whether people exist in the environment, if detects that people exist in the environment, the camera scans and captures videos or images of people; the image recognition module, adapted to match videos or images of people captured by the video control module with pre-stored videos or images of people, to obtain matching result, if the matching result shows that the captured videos or images of people are stranger's, provide corresponding control instructions; the sound and light alarm of the sound and light control module, adapted to give an alarm by sending out sound and light according to the corresponding control instructions.

According to another embodiment of the present invention, a theft prevention monitoring system includes: the theft prevention monitoring device, a mobile terminal, and a server, wherein a communication module of the theft prevention monitoring device is adapted to provide matching result and captured videos or images of people to the mobile terminal or the server, the mobile terminal or the server is adapted to send corresponding control instructions to a sound and light control module or an expression control module of the theft prevention monitoring device according to the matching result and captured videos or images of people.

According to another embodiment of this disclosure, a theft prevention monitoring method includes: a moving control module controls a moving mechanism of a theft prevention monitoring device to move along a running route; a video control module uses a camera to scan environment information, real-time builds dynamic map of environment according to the environmental information, and generates the running route for navigating the theft prevention monitoring device during the moving mechanism moves, the camera detects whether people exist in the environment during the moving mechanism moves, if detects that people exist in the environment, the video control module controls the camera to scan and capture videos or images of people; an image recognition module matches videos or images of people captured by the video control module with pre-stored videos or images of people, to obtain matching result, if the matching result shows that the captured videos or images of people are stranger's, the video control module provides corresponding control instructions; a sound and light control alarm of a sound and light control module gives an alarm by sending out sound and light according to the corresponding control instructions.

The remote vehicle control device provided by the present embodiment can control a moving mechanism of the theft prevention monitoring device to move along a running route by a moving control module. The video control module uses a camera to scan environment information, real-time builds dynamic map of environment according to the environmental information, and generates the miming route for navigating the theft prevention monitoring device during the moving mechanism moves. The camera also detects whether people exist in the environment, if detects that people exist in the environment, the camera scans and captures videos or images of people. The image recognition module matches videos or images of people captured by the video control module with pre-stored videos or images of people, to obtain matching result, if the matching result shows that the captured videos or images of people are stranger's, provide corresponding control instructions. The sound and light alarm of the sound and light control module gives an alarm by sending out sound and light according to the corresponding control instructions, thereby, effectively monitoring the environment in real time, effectively ensuring the safety of life and property, and improving the safety of the environment.

DETAILED DESCRIPTION OF PREFERRED EMBODIMENTS

To make the objective, the technical solutions and advantages of the present invention more clear and understandable, embodiments of the present disclosure will be described in detail accompanying with figures as follows.

The First Embodiment

Figure 1:
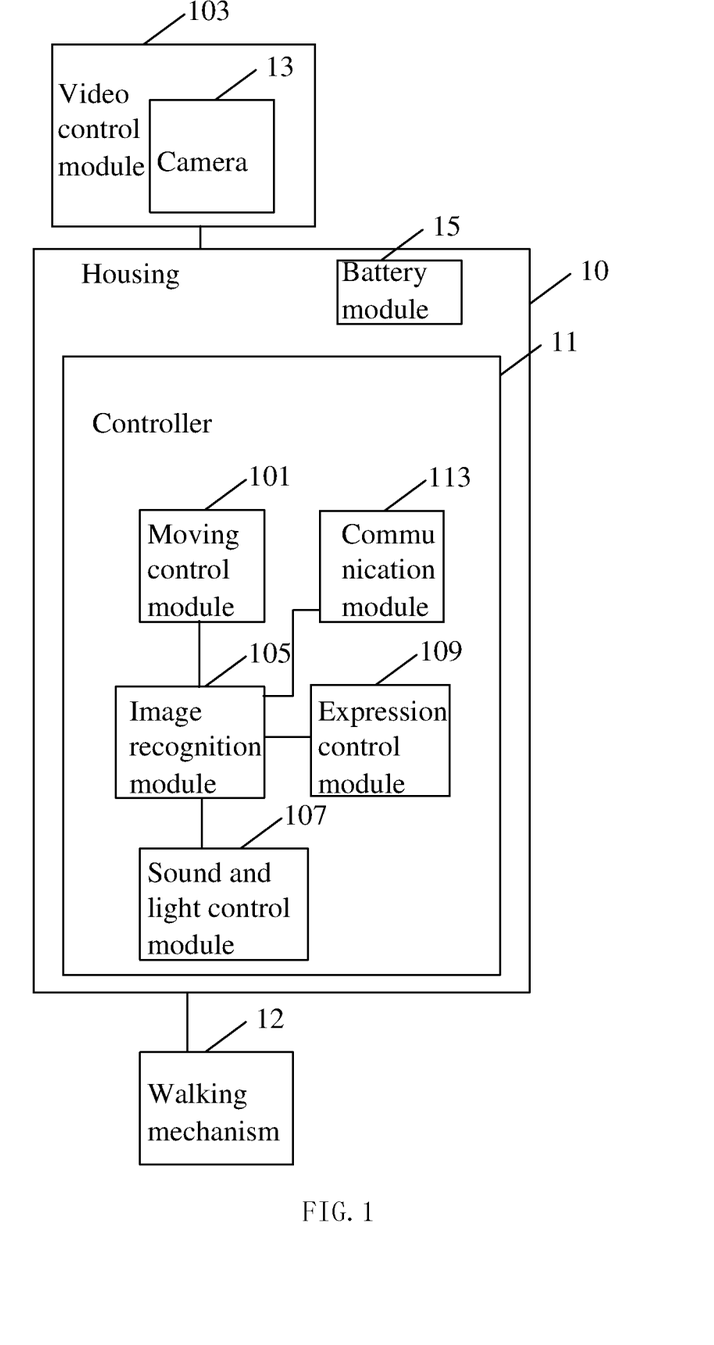
FIG. 1 is a schematic block diagram of a theft prevention monitoring device in accordance with example embodiments of the present disclosure.
Figure 2:
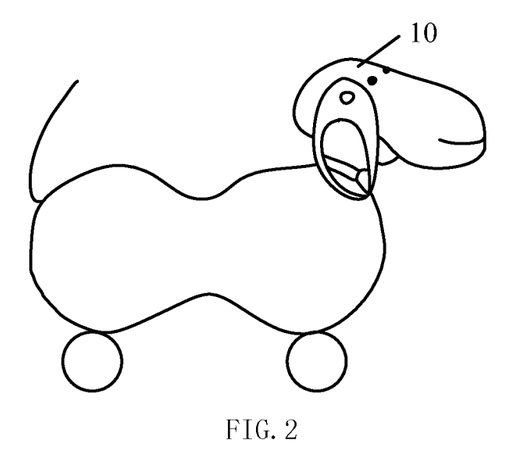
FIG. 2 is a schematic diagram of the theft prevention monitoring device of FIG. 1.

FIG. 1 is a schematic block diagram of a theft prevention monitoring device in accordance with an exemplary embodiment of the present disclosure. FIG. 2 is a schematic diagram of the theft prevention monitoring device of FIG. 1. Referring to FIG. 1 and FIG. 2, the theft prevention monitoring device may include a housing 10, a moving mechanism 12 which is arranged under the housing 10, a controller 11 inside the housing 10, and a video control module 103 which includes a camera 13 on the housing 10. The controller 11 includes a moving control module 101, an image recognition module 105, and a sound and light control module 107.

In detail, the moving control module 101 is configured to control the moving mechanism 12 of the theft prevention monitoring device to move along a running route.

In some examples, in order to avoid dead corner and enhance the effect of theft prevention, the moving mechanism 12 is arranged under the housing 10. And in order to be convenient to move, the moving mechanism 12 may be a roller wheel which has ability to climb over a certain height (off-road capability), and can move over stones, grass, carpet, threshold, or other obstacles.

In addition, in order to avoid dead corner, the theft prevention monitoring device can also include an ultrasonic sensor or a (visual simultaneous localization and mapping, VSLAM) system to perform navigation. The ultrasonic sensor is configured to detect obstacles, and generate an autonomous navigation route provided to the moving control module 101 according to pre-stored map information, such as room map information. The moving control module 101 is configured to control the moving mechanism 12 to move along the autonomous navigation route according to the autonomous navigation route. The ultrasonic sensor can detect running route on the ground and make the theft prevention monitoring device avoid obstacles, and control the moving mechanism 12 to move along the running route laid by owner. The VSLAM system can be set in the video control module 103, the VSLAM system can use the camera 13 to scan environment information, such as room information, real-time build dynamic 2D map of environment according to the environmental information, dynamic model for the environment information to generate a running route for navigating the theft prevention monitoring device, and provide the running route to the moving control module 101, thereby, dynamic positioning or navigation for the theft prevention monitoring device in the room or other sites. So that, the theft prevention monitoring device can build environment map, while at the same time can estimate its location in the environment, to achieve ultrasonic or laser navigation in higher accuracy and timeliness. If the site is relatively large, the administrator can set many theft prevention monitoring devices to jointly monitor the site. When one or several theft prevention monitoring devices find suspicious person appears, idle theft prevention monitoring devices will reach each location of the suspicious person, to scan and capture videos or images of relevant person from multi angles.

The video control module 103 is configured to use the camera 13 to scan environment information, real-time build dynamic map of environment according to the environmental information, and generate the running route for navigating the theft prevention monitoring device during the moving mechanism 12 moves. The camera 13 is also configured to detect whether people exist in the environment. If detects that people exist in the environment, the camera 13 scans and captures videos or images of people. The camera 13 can be an infrared camera, can capture videos or images of people from 360 degrees even in weak light environment. Among them, the video control module 103 can use the VSLAM system based on the camera 13 to scan environment information, dynamic model to navigate for the theft prevention monitoring device, and use the camera to capture videos or image of people in the environment. Because the camera 13 can rotate by 360 degrees, it can real-time scan and capture videos or images of the environment. In addition, in order to improve the imaging effect at night, a small lamp can be set on the camera 13, such as a LED lamp. Because the thief may cut off the power and then enter the room, especially at night, even if the owner finds the thief, he unable to see, and cannot effectively prevent the thief, because of setting the LED lamp, thereby, becoming easy to catch the thief or clearly scan and capture videos or images of the thief.

Preferably, the controller may also include a storing module that stores videos or images of people, such as videos or images of acquaintances or strangers, especially face images. The administrator of the theft prevention monitoring device can copy or send the videos or images of people to the storing module via the network, and can also download videos or images of escaped people on public security network to be stored in the storing module.

The image recognition module 105 is configured to match videos or images of people captured by the video control module 103 with pre-stored videos or images of people, to obtain matching result. If the matching result shows that the captured videos or images of people are stranger's, provide corresponding control instructions. Among them, the image recognition module 105 matches videos or images of people captured by the video control module 103 with the pre-stored videos or images of people, thereby, can get the matching result that whether videos or images of people are acquaintance's or stranger's.

Preferably, the sound and light control module 107 can include a sound and light alarm. The sound and light alarm of the sound and light control module is configured to give an alarm by sending out sound and light according to the corresponding control instructions. For example, the sound and light alarm can include buzzer or flash light, respectively for sending out sound and light, to scare the stranger. When the sound and light alarm is triggered to give an alarm, it can bring psychological pressure to the thief, and the neighbors hear sound of the alarm, then they can help the owner to catch the thief.

Preferably, the controller may also include: the expression control module 109. The expression control module 109 is configured to control the theft prevention monitoring device to show corresponding expressions according to the corresponding control instructions, which can further scare strangers. Among them, as shown in FIG. 2, the theft prevention monitoring device can be set to look like a pet dog, with head, trunk, limbs and tail, etc. The head is provided with facial features. The expression control module 109 can control movements of eyes and mouth to show corresponding expressions. Limbs are controlled by the moving control module to simulate walking of the dog, and tail can also be controlled to wave. The camera of the video control module can be installed at eyes of the pet dog. The sound and light control module can make the theft prevention control device send out sound, vaguely resembling bark of a dog. The above expressions can include joy, anger or sorrow. For example, corresponding expression can be shown to acquaintances or strangers according to different control instructions, happy expressions can be shown to acquaintances, such as control pet dog's mouth to set in a wide smile, and angry expressions can be shown to strangers, such as control pet dog's eyes to turn up etc.

Preferably, the theft prevention monitoring device can also include a battery module 15. In order to keep working, the battery module 15 can include an automatic charging device. The automatic charging device is configured to receive wireless signal emitted by a power supply, and automatically find location of the power supply for recharging.

Preferably, the controller may also include: a communication module 113. The communication module 113 is configured to call alarm system or send information to the alarm system according to the corresponding control instructions, or call mobile terminal or server according to the corresponding control instructions, or send information to the mobile terminal or server according to the corresponding control instructions. The communication module 113 is also configured to provide matching result and captured videos or images of people to the mobile terminal or server, and the mobile terminal or server sends corresponding control instructions to the sound and light control module or the expression control module of the theft prevention monitoring device according to the matching result and captured videos or images of people, such as make the sound and light control module give an alarm by sending out sound and light, or make the expression control module show corresponding expressions.

Among them, the alarm system can be an alarm system, or a server system of a guard or security personnel. The mobile terminal or server may be connected to the theft prevention monitoring device via a wireless network. The wireless network may be WIFI, 3G, 4G, 5G, or other wireless networks. The mobile terminal may be a mobile phone, a tablet computer, or other mobile communication devices etc. The communication module 113 can call the alarm system or send information, such as location information or image information, to the alarm system according to the corresponding control instructions, or call mobile terminal or server according to the corresponding control instructions, or send information such as location information or image information to the mobile terminal or server according to the corresponding control instructions, thereby notify the mobile terminal or server that suspicious person appears. In addition, the communication module 113 sends matching result and captured videos or images of people to the mobile terminal or server, in order to make the mobile terminal or server determine whether to give an alarm or not, or make the mobile terminal or server further match the captured videos or images of people with the pre-stored videos or images to obtain matching result, and determine whether the matching result is correct. If the matching result is the same as the matching result obtained by the image recognition module, the mobile terminal can send the corresponding control instructions, such as an alarm control instruction, to the sound and light control module to give an alarm by sending out sound and light, or to the expression control module to show corresponding expressions. In addition, if the matching result is the same as the matching result obtained by the image recognition module, the mobile terminal can also call alarm system, or send information to the alarm system. For example, once the image recognition module of the theft prevention monitoring device finds that suspicious person appears, the image recognition module will upload videos or images of suspicious person to the mobile terminal or server. If administrator of the mobile terminal or server determines the suspicious person, the mobile terminal or server sends control instructions to the sound and light control module of the theft prevention monitoring device to trigger the sound and light alarm to give an alarm. If the administrator of the mobile terminal or server determines the person is popular, the mobile terminal or server controls the expression control module of the theft prevention monitoring device to show friendly expressions, etc.

The theft prevention monitoring device provided by the present embodiment can control a moving mechanism of the theft prevention monitoring device to move along a running route by a moving control module. The video control module uses a camera to scan environment information, real-time builds dynamic map of environment according to the environmental information, and generates the running route for navigating the theft prevention monitoring device during the moving mechanism moves. The camera also detects whether people exist in the environment, if detects that people exist in the environment, the camera scans and captures videos or images of people. The image recognition module matches videos or images of people captured by the video control module with pre-stored videos or images of people, to obtain matching result, if the matching result shows that the captured videos or images of people are stranger's, provide corresponding control instructions. The sound and light alarm of the sound and light control module gives an alarm by sending out sound and light according to the corresponding control instructions, thereby, effectively monitoring the environment in real time, effectively ensuring the safety of life and property, and improving the safety of the environment.

In addition, the theft prevention monitoring device provided by the present embodiment can also control the theft prevention monitoring device to show corresponding expressions by an expression control module, thereby scaring strangers, and further improving the safety of the environment.

In addition, the theft prevention monitoring device provided by the present embodiment can also call alarm system or send information to the alarm system according to the corresponding control instructions, or call mobile terminal or server according to the corresponding control instructions, or send information to the mobile terminal or server according to the corresponding control instructions. The mobile terminal or server sends corresponding control instructions to the sound and light control module or the expression control module of the theft prevention monitoring device according to the matching result and captured videos or images of people, thereby immediately notifying the user or the alarm system to take appropriate actions, and further improving the safety of the environment.

The Second Embodiment

Figure 3:
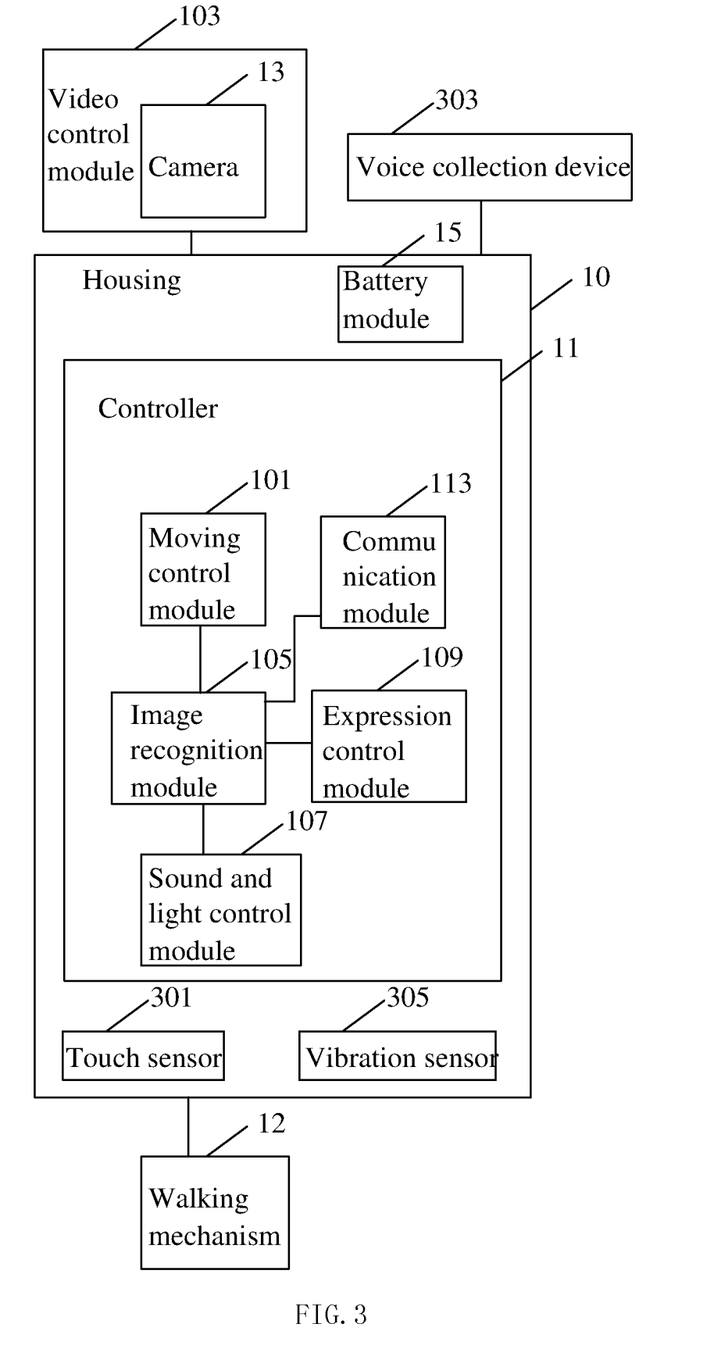
FIG. 3 is a schematic block diagram of a theft prevention monitoring device in accordance with example embodiments of the present disclosure.

FIG. 3 is a schematic block diagram of a theft prevention monitoring device in accordance with example embodiments of the present disclosure. Referring to FIG. 3, the theft prevention monitoring device further includes a touch sensor 301, and/or a voice collection device 303, and/or a vibration sensor 305.

Specifically, the touch sensor 301 is configured to detect touch operation on a surface of the housing, generate corresponding touch signal according to the touch operation, and control the expression control module to show corresponding expressions according to the corresponding touch signal.

Among them, in the housing of the theft prevention monitoring device can be provided with the touch sensor 301. The touch sensor 301 can determine gestures made by owner, such as tapping or other touch operations, and control the expression control module to show corresponding expressions, such as expressions of joy, anger or sorrow, according to the touch operations.

Preferably, the theft prevention monitoring device may also include the voice collection device 303. The voice collection device 303 is configured to collect voice information of user, match the collected voice information of user with pre-stored voice information to obtain matching result, and control the sound and light control module to send out corresponding sound and light, or make the expression control module to control the theft prevention monitoring device to show corresponding expressions according to the matching result.

The voice collection device 303 can store voice tone of many people when the theft prevention monitoring device is initialized, such as "come here", "go", "sit down", "stand up", or "don't talk", etc. If collected voice information of user, such as "come here", is matched with pre-stored voice information, the voice collection device 303 can control the sound and light control module to send out corresponding sound, such as "OK", or can control the sound and light control module to send out warm light, or can make the expression control module to control the theft prevention monitoring device to show corresponding expressions of pleasure, such as control mouth to set in a wide smile, or can make the moving control module to control the walking mechanism to walk towards owner. On the contrary, if the collected voice information of user, such as "come here", is not matched with pre-stored voice information, the voice collection device 303 can control the sound and light control module to send out corresponding sound, such as "woof woof", or can control the sound and light control module to send out flash, or can make the expression control module to control the theft prevention monitoring device to show corresponding angry expressions, such as control eyes to turn up, or can control the moving control module to control the walking mechanism to stamp, etc.

Preferably, the theft prevention monitoring device can also include the vibration sensor 305. The vibration sensor 305 is configured to detect vibration position in standby mode of the theft prevention monitoring device, and make the moving control module 101 to control the walking mechanism 12 to reach the vibration position, make the camera of the video control module 103 to carry out a wide range of scanning and capturing near the vibration position.

Among them, in order to save electricity, the theft prevention monitoring device can be arranged with the vibration sensor 305. After user falls asleep at night, the theft prevention monitoring device enters standby mode, when the vibration sensor 305 detects vibration signal, it can obtain the vibration position, and can quickly reach the vibration position and open camera system of the video control module 103 to carry out a wide range of scanning and capturing near the vibration position.

In addition, the theft prevention monitoring device provided by the present embodiment can also detect touch operation on a surface of the housing, generate corresponding touch signal according to the touch operation, and control the expression control module to show corresponding expressions according to the corresponding touch signal, thereby can make a corresponding response to touch operation.

The prevention monitoring device provided by the present embodiment can also collect voice information of user, match the collected voice information of user with pre-stored voice information to obtain matching result, and control the sound and light control module to send out corresponding sound and light, or make the expression control module to control the theft prevention monitoring device to show corresponding expressions according to the matching result, thereby, identifying different voices of user, immediately finding suspicious person through the voice, and taking appropriate actions to further improve the safety of the environment.

The prevention monitoring device provided by the present embodiment can also detect vibration position in standby mode of the theft prevention monitoring device, and make the moving control module to control the walking mechanism to reach the vibration position, make the camera of the video control module to carry out a wide range of scanning and capturing near the vibration position, thereby effectively monitoring the environment in real time, and saving electricity.

The Third Embodiment

Figure 4:
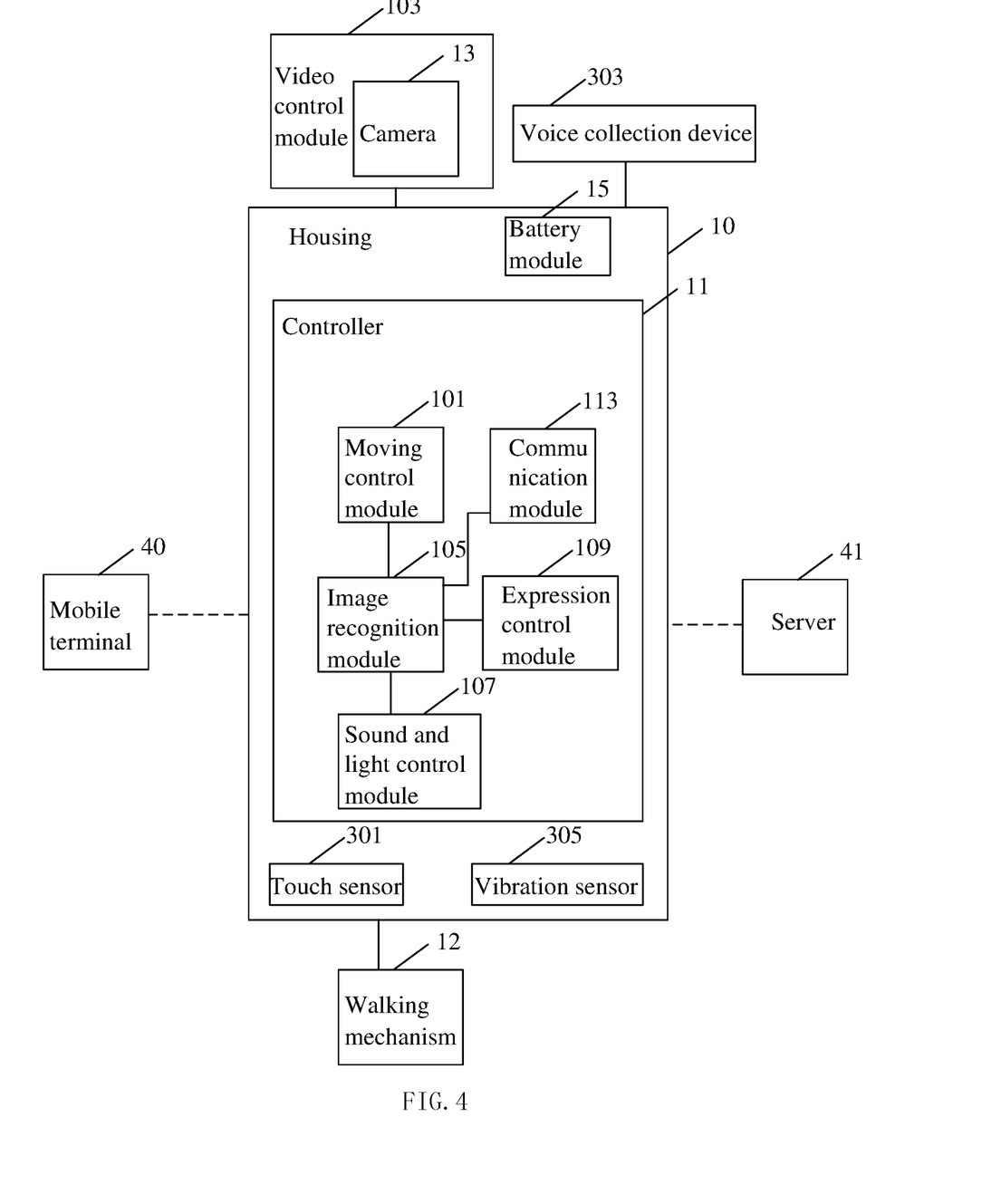
FIG. 4 is a schematic block diagram of a theft prevention monitoring system in accordance with example embodiments of the present disclosure.

FIG. 4 is a schematic block diagram of a theft prevention monitoring system in accordance with example embodiments of the present disclosure. Referring to FIG. 4, the theft prevention monitoring system includes the theft prevention monitoring device of the first, second and third embodiments, a mobile terminal 40, and a server 41.

The communication module 113 of the theft prevention monitoring device is configured to provide matching result and captured videos or images of people to the mobile terminal 40 or the server 41. The mobile terminal 40 or the server 41 is configured to send corresponding control instructions to the sound and light control module or the expression control module of the theft prevention monitoring device according to the matching result and captured videos or images of people.

Preferably, the mobile terminal 40 or the server 41 is also configured to call alarm system or send information to the alarm system according to matching result and the captured videos or images of people.

Among them, the alarm system can be an alarm system, or a server system of a guard or security personnel. The mobile terminal or server may be connected to the theft prevention monitoring device via a wireless network. The wireless network may be WIFI, 3G, 4G, 5G, or other wireless networks. The mobile terminal may be a mobile phone, a tablet computer, or other mobile communication devices etc. The communication module 113 can call the alarm system or send information, such as location information or image information, to the alarm system according to the corresponding control instructions, or call mobile terminal or server according to the corresponding control instructions, or send information such as location information or image information to the mobile terminal or server according to the corresponding control instructions, thereby notify the mobile terminal or server that suspicious person appears. In addition, the communication module 113 sends matching result and captured videos or images of people to the mobile terminal or server, in order to make the mobile terminal or server determine whether to give an alarm or not, or make the mobile terminal or server further match the captured videos or images of people with the pre-stored videos or images to obtain matching result, and determine whether the matching result is correct. If the matching result is the same as the matching result obtained by the image recognition module, the mobile terminal can send the corresponding control instructions, such as an alarm control instruction, to the sound and light control module to give an alarm by sending out sound and light, or to the expression control module to show corresponding expressions. If the matching result is the same as the matching result obtained by the image recognition module, the mobile terminal can also call alarm system, or send information to the alarm system. For example, once the image recognition module of the theft prevention monitoring device finds that suspicious person appears, the image recognition module will upload videos or images of suspicious person to the mobile terminal or server. If administrator of the mobile terminal or server determines the suspicious person, the mobile terminal or server sends control instructions to the sound and light control module of the theft prevention monitoring device to trigger the sound and light alarm to give an alarm. If the administrator of the mobile terminal or server determines the person is popular, the mobile terminal or server controls the expression control module of the theft prevention monitoring device to show friendly expressions, etc.

In addition, the theft prevention monitoring system provided by the present embodiment can provide matching result and captured videos or images of people to the mobile terminal or the server. The mobile terminal or the server sends corresponding control instructions to a sound and light control module or an expression control module of the theft prevention monitoring device according to the matching result and captured videos or images of people. And the mobile terminal or the server can also call alarm system or send information to the alarm system according to matching result and the captured videos or images of people, thereby immediately notifying the user or the alarm system to take appropriate actions, and further improving the safety of the environment.

The Fourth Embodiment

Figure 5:
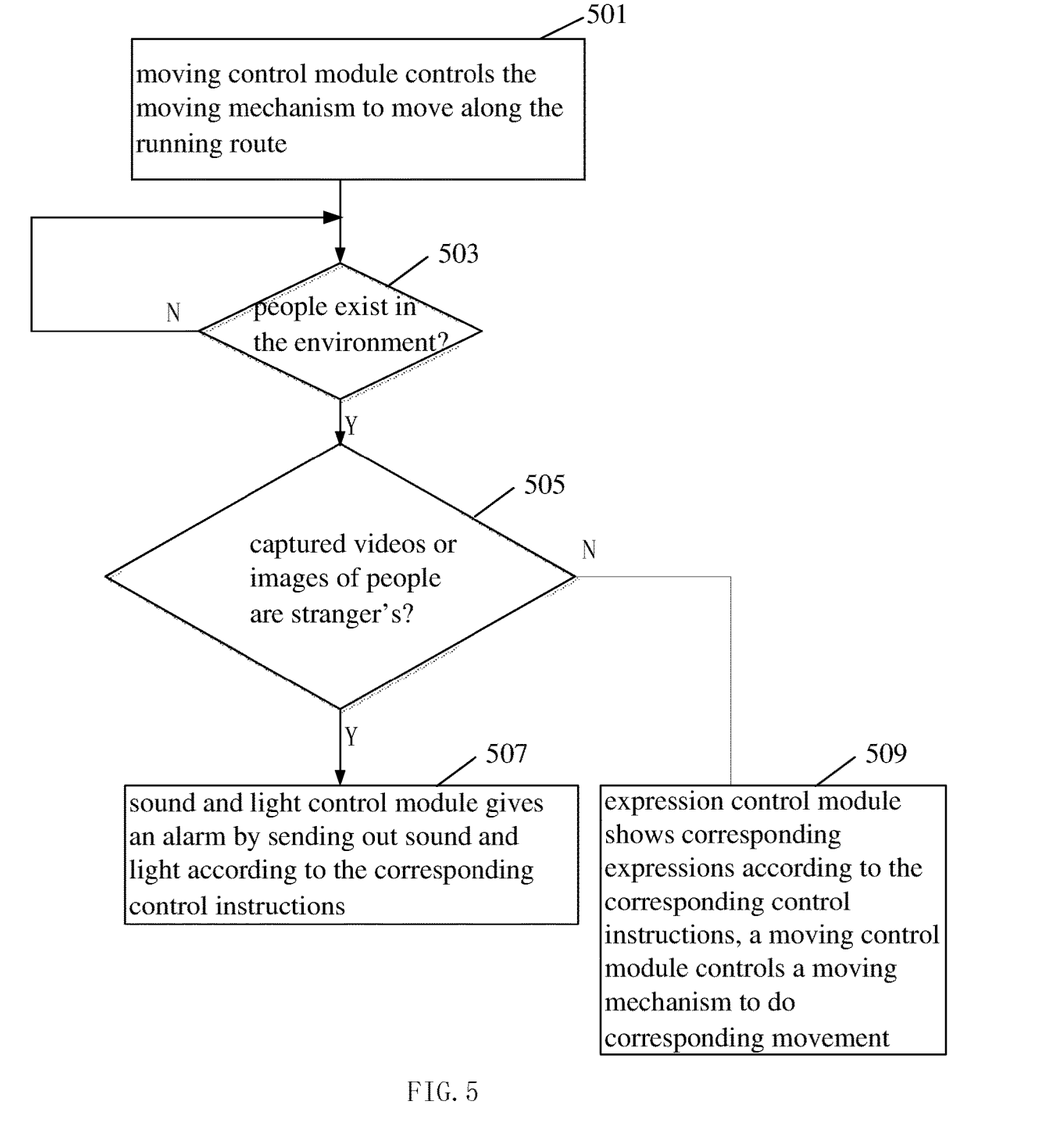
FIG. 5 is a flowchart of a theft prevention monitoring method in accordance with example embodiments of the present disclosure.

FIG. 5 is a flowchart of a theft prevention monitoring method in accordance with example embodiments of the present disclosure. Referring to FIG. 5, the theft prevention monitoring method includes the following steps:

Step 501: a video control module uses a camera to scan environment information, real-time builds dynamic map of environment according to the environmental information, and generates a running route for navigating a theft prevention monitoring device during a moving mechanism moves, a moving control module controls the moving mechanism to move along the running route.

Step 503: the camera detects whether people exist in the environment during the moving mechanism moves, if detects that people exist in the environment, turn to step 505, if not detect that people exist in the environment, turn to step 503.

Step 505: the video control module controls the camera to scan and capture videos or images of people, the image recognition module matches videos or images of people captured by the video control module with pre-stored videos or images of people, to obtain matching result, if the matching result shows that the captured videos or images of people are stranger's, turn to step 507, if the matching result not show that the captured videos or images of people are stranger's, turn to step 509.

Step 507: the video control module provides corresponding control instructions, a sound and light control module gives an alarm by sending out sound and light according to the corresponding control instructions.

Step 509: the video control module provides corresponding control instructions, an expression control module shows corresponding expressions according to the corresponding control instructions, a moving control module controls a moving mechanism to do corresponding movement, such as wave tail.

In some examples, before step 501, further includes the following steps: the theft prevention monitoring device is initialized, voice information and videos or images of people are pre-stored.

In some examples, step 507 may further include the following steps: a communication module calls alarm system or sends information to the alarm system according to the corresponding control instructions, or calls mobile terminal or server according to the corresponding control instructions, or sends information to the mobile terminal or server according to the corresponding control instructions; or The communication module provides matching result and captured videos or images of people to the mobile terminal or server, and the mobile terminal or server sends corresponding control instructions to the sound and light control module or an expression control module of the theft prevention monitoring device according to the matching result and captured videos or images of people.

The theft prevention monitoring method provided by the present embodiment can control a moving mechanism of the theft prevention monitoring device to move along a running route by a moving control module. The video control module uses a camera to scan environment information, real-time builds dynamic map of environment according to the environmental information, and generates the running route for navigating the theft prevention monitoring device during the moving mechanism moves. The camera also detects whether people exist in the environment, if detects that people exist in the environment, the camera scans and captures videos or images of people. The image recognition module matches videos or images of people captured by the video control module with pre-stored videos or images of people, to obtain matching result, if the matching result shows that the captured videos or images of people are stranger's, provide corresponding control instructions. The sound and light alarm of the sound and light control module gives an alarm by sending out sound and light according to the corresponding control instructions, thereby, effectively monitoring the environment in real time, effectively ensuring the safety of life and property, and improving the safety of the environment.

The above descriptions are only preferred embodiments of the present invention, and are not intended to limit the present invention. Any amendments, replacement and modification made to the above embodiments under the principle of the present invention should be included in the scope of the present invention.

What is claimed is:

1. A theft prevention monitoring device, comprising: a housing, a moving mechanism which is arranged under the housing, a controller inside the housing, and a video control module which includes a camera on the housing, the controller comprising a moving control module, an image recognition module, and a sound and light control module, the sound and light control module comprising a sound and light control alarm;
   the moving control module, adapted to control the moving mechanism of the theft prevention monitoring device to move along a running route to take the theft prevention monitoring device from one place to another place;
   the video control module, adapted to use the camera to scan environment information, real-time build dynamic map of environment according to the environmental information, and generate the running route for navigating the theft prevention monitoring device to move from one place to another place during the moving mechanism moves, wherein the camera is also adapted to detect whether people exist in the environment, if detects that people exist in the environment, the camera scans and captures videos or images of people;
   the image recognition module, adapted to match videos or images of people captured by the video control module with pre-stored videos or images of people, to obtain matching result, if the matching result shows that the captured videos or images of people are stranger's, provide corresponding control instructions;
   the sound and light alarm of the sound and light control module, adapted to give an alarm by sending out sound and light according to the corresponding control instructions.

2. The device as claimed in claim 1, wherein the controller further comprises an expression control module, the expression control module is adapted to control the theft prevention monitoring device to show corresponding expressions according to the corresponding control instructions.

3. The device as claimed in claim 2, wherein the device further comprises a touch sensor, the touch sensor is adapted to detect touch operation on a surface of the housing, generate corresponding touch signal according to the touch operation, and control the expression control module to show corresponding expressions according to the corresponding touch signal.

4. The device as claimed in claim 1, wherein the device further comprises a battery module, the battery module comprises an automatic charging device, the automatic charging device is adapted to receive wireless signal emitted by a power supply, and automatically find location of the power supply for recharging.

5. The device as claimed in claim 1, wherein the device further comprises a communication module, the communication module is adapted to call alarm system or send information to the alarm system according to the corresponding control instructions, or call a mobile terminal or a server according to the corresponding control instructions, or send information to the mobile terminal or the server according to the corresponding control instructions.

6. The device as claimed in claim 5, wherein the communication module is further configured to provide matching result and captured videos or images of people to the mobile terminal or the server, and the mobile terminal or the server sends corresponding control instructions to the sound and light control module or an expression control module of the theft prevention monitoring device according to the matching result and captured videos or images of people.

7. The device as claimed in claim 1, wherein the device further comprises a vibration sensor, the vibration sensor is adapted to detect vibration position in standby mode of the theft prevention monitoring device, and make the moving control module to control the moving mechanism to reach the vibration position, make the camera of the video control module to carry out a wide range of scanning and capturing near the vibration position.

8. The device as claimed in claim 1, wherein device further comprises a voice collection device, the voice collection device is adapted to collect voice information of user, match the collected voice information of user with pre-stored voice information to obtain matching result, and control the sound and light control module to send out corresponding sound and light, or make an expression control module to control the theft prevention monitoring device to show corresponding expressions according to the matching result.

9. The device as claimed in claim 1, wherein the camera is an infrared camera, and the camera is adapted to capture videos or images of people from 360 degrees even in weak light environment.

10. A theft prevention monitoring system, comprising: the theft prevention monitoring device as claimed in claim 1, a mobile terminal, and a server, wherein a communication module of the theft prevention monitoring device is adapted to provide matching result and captured videos or images of people to the mobile terminal or the server, the mobile terminal or the server is adapted to send corresponding control instructions to a sound and light control module or an expression control module of the theft prevention monitoring device according to the matching result and captured videos or images of people.

11. The system as claimed in claim 10, wherein the mobile terminal or the server is further adapted to call alarm system or send information to the alarm system according to matching result and the captured videos or images of people.

12. A theft prevention monitoring method comprising steps that:
   a moving control module controls a moving mechanism of a theft prevention monitoring device to move along a running route to take the theft prevention monitoring device from one place to another place;

a video control module uses a camera to scan environment information, real-time builds dynamic map of environment according to the environmental information, and generates the running route for navigating the theft prevention monitoring device from one place to another place during the moving mechanism moves, the camera detects whether people exist in the environment during the moving mechanism moves, if the camera detects that people exist in the environment, the video control module controls the camera to scan and capture videos or images of people;

an image recognition module matches videos or images of people captured by the video control module with pre-stored videos or images of people, to obtain matching result, if the matching result shows that the captured videos or images of people are stranger's, the video control module provides corresponding control instructions;

a sound and light control alarm of a sound and light control module gives an alarm by sending out sound and light according to the corresponding control instructions.

13. The method as claimed in claim 12, further comprising steps that:

a communication module calls alarm system or sends information to alarm system according to the corresponding control instructions, or calls a mobile terminal or a server according to the corresponding control instructions, or sends information to the mobile terminal or the server according to the corresponding control instructions; or the communication module provides matching result and captured videos or images of people to the mobile terminal or the server, and the mobile terminal or the server sends corresponding control instructions to the sound and light control module or an expression control module of the theft prevention monitoring device according to the matching result and captured videos or images of people.

14. The system as claimed in claim 10, wherein the controller further comprises an expression control module, the expression control module is adapted to control the theft prevention monitoring device to show corresponding expressions according to the corresponding control instructions.

15. The system as claimed in claim 14, wherein the device further comprises a touch sensor, the touch sensor is adapted to detect touch operation on a surface of the housing, generate corresponding touch signal according to the touch operation, and control the expression control module to show corresponding expressions according to the corresponding touch signal.

16. The system as claimed in claim 10, wherein the device further comprises a vibration sensor, the vibration sensor is adapted to detect vibration position in standby mode of the theft prevention monitoring device, and make the moving control module to control the moving mechanism to reach the vibration position, make the camera of the video control module to carry out a wide range of scanning and capturing near the vibration position.

17. The system as claimed in claim 10, wherein the device further comprises a communication module, the communication module is adapted to call alarm system or send information to the alarm system according to the corresponding control instructions, or call the mobile terminal or the server according to the corresponding control instructions, or send information to the mobile terminal or the server according to the corresponding control instructions.

18. The system as claimed in claim 17, wherein the communication module is further configured to provide matching result and captured videos or images of people to the mobile terminal or the server, and the mobile terminal or server sends corresponding control instructions to the sound and light control module or the expression control module of the theft prevention monitoring device according to the matching result and captured videos or images of people.

19. The method as claimed in claim 12, further comprising:

detecting vibration by a vibration sensor when the theft prevention monitoring device is in standby mode, when the vibration sensor detects a vibration, the vibration sensor makes the moving control module to control the moving mechanism to reach a vibration position, makes the camera of the video control module to carry out a wide range of scanning and capturing near the vibration position.

* * * * *